United States Patent
Claffery et al.

(10) Patent No.: US 6,195,553 B1
(45) Date of Patent: Feb. 27, 2001

(54) METHOD AND APPARATUS FOR DETERMINING OPTIMAL PATHS AMONG OBJECTS OF A COMMUNICATIONS NETWORK

(75) Inventors: Douglas J. Claffery, Malvern; David M. Holland, Reading; James W. Woodburn, King of Prussia, all of PA (US)

(73) Assignee: Analytical Graphics, Inc., Malvern, PA (US)

( * ) Notice: Subject to any disclaimer, the term of this patent is extended or adjusted under 35 U.S.C. 154(b) by 0 days.

(21) Appl. No.: 09/294,490

(22) Filed: Apr. 20, 1999

(51) Int. Cl.$^7$ .......................................................... H04Q 7/20
(52) U.S. Cl. ........................................... 455/445; 455/428
(58) Field of Search .................................... 455/445, 426, 455/427, 428, 12.1, 405, 417, 13.1; 379/219, 220, 221, 114, 115

(56) References Cited

U.S. PATENT DOCUMENTS

| | | | |
|---|---|---|---|
| 5,173,933 | * 12/1992 | Jabs et al. ............................. | 455/445 |
| 5,233,604 | 8/1993 | Ahmadi et al. ........................ | 370/60 |
| 5,287,541 | * 2/1994 | Davis et al. ........................... | 455/427 |
| 5,408,231 | 4/1995 | Bowdon ................................. | 340/826 |
| 5,471,467 | 11/1995 | Johann .................................... | 370/60 |
| 5,526,400 | * 6/1996 | Nguyen .................................. | 455/445 |
| 5,600,638 | 2/1997 | Bertin et al. .......................... | 370/351 |
| 5,654,958 | 8/1997 | Natarajan ............................... | 370/410 |
| 5,740,164 | 4/1998 | Liron ..................................... | 370/316 |
| 5,754,120 | 5/1998 | Argentati ............................... | 340/876 |
| 5,754,543 | 5/1998 | Seid ...................................... | 370/351 |
| 6,067,452 | * 5/2000 | Alexander ............................. | 455/428 |
| 6,091,933 | * 7/2000 | Sherman et al. ...................... | 455/427 |

* cited by examiner

Primary Examiner—Dwayne D. Bost
Assistant Examiner—Anochien B. Vuong
(74) Attorney, Agent, or Firm—Roberts Abokhair & Mardula (57) ABSTRACT

The present invention relates to a method and apparatus for selecting a path between an originating point and a destination point in a communications network comprising a number of objects for a certain time interval. The method comprises constructing a link availability matrix which comprises a start time and an end time for a link between any two objects in the communications network. The start time for all links in the link availability matrix are arranged in a chronological order. A cost matrix is generated for the first start time in the link availability matrix based on selected factors and continuing through the following start times until a connecting path is found between the originating point and destination point using a number of objects in the network. After a connecting path is found, a first disconnect time based on the end times in the link availability matrix for the objects in the connecting path is selected. Steps (c) and (d) are repeated for all subsequent start time in the link availability matrix for the time interval to identify other connecting paths for the origination and destination points. An optimal path is selected for the communication between the origination and destination points based on the selected factors. The invention also relates to the utilization of graphical depictions of the optimal path preferably on a computer showing Earth imagery and the location of the objects in the communication system.

13 Claims, 7 Drawing Sheets

Report: CellPhone-Iridium-EndUser - Cost Strand Access

File   Edit                                                                                                                                                     Help Chain-CellPhone-Iridium-EndUser

| Start Time (UTCG) | Stop Time (UTCG) | |
|---|---|---|
| 1 Jun 1998 16:00:00.00 | 1 Jun 1998 16:08:11.59 | CellPhone to plane1105 to plane2104 to plane2105 to EndUser |
| 1 Jun 1998 16:08:11.59 | 1 Jun 1998 16:16:42.66 | CellPhone to plane1106 to plane2105 to plane2106 to EndUser |
| 1 Jun 1998 16:16:42.66 | 1 Jun 1998 16:25:46.68 | CellPhone to plane1107 to plane2106 to plane3106 to plane3107 to EndUser |
| 1 Jun 1998 16:25:46.68 | 1 Jun 1998 16:34:49.96 | CellPhone to plane1108 to plane2107 to plane3107 to plane3108 to EndUser |
| 1 Jun 1998 16:34:49.96 | 1 Jun 1998 16:35:50.64 | CellPhone to plane1109 to plane2108 to plane3108 to plane3109 to EndUser |
| 1 Jun 1998 16:35:50.64 | 1 Jun 1998 16:43:51.25 | CellPhone to plane1109 to plane2108 to plane3109 to EndUser |
| 1 Jun 1998 16:43:51.25 | 1 Jun 1998 16:46:04.43 | CellPhone to plane2109 to plane3109 to plane3110 to EndUser |
| 1 Jun 1998 16:46:04.43 | 1 Jun 1998 16:52:50.57 | CellPhone to plane1110 to plane2109 to plane2110 to plane3110 to EndUser |
| 1 Jun 1998 16:52:50.57 | 1 Jun 1998 16:56:05.14 | CellPhone to plane2110 to plane3110 to plane3111 to EndUser |
| 1 Jun 1998 16:56:05.14 | 1 Jun 1998 17:01:47.80 | CellPhone to plane2111 to plane3111 to EndUser |
| 1 Jun 1998 17:01:47.80 | 1 Jun 1998 17:05:57.37 | CellPhone to plane2111 to plane3111 to plane3101 to EndUser |
| 1 Jun 1998 17:05:57.37 | 1 Jun 1998 17:10:42.98 | CellPhone to plane2101 to plane3101 to EndUser |
| 1 Jun 1998 17:10:42.98 | 1 Jun 1998 17:15:43.30 | CellPhone to plane2101 to plane3101 to plane3102 to EndUser |
| 1 Jun 1998 17:15:43.30 | 1 Jun 1998 17:19:35.96 | CellPhone to plane2102 to plane3102 to EndUser |
| 1 Jun 1998 17:19:35.96 | 1 Jun 1998 17:25:24.03 | CellPhone to plane2102 to plane3102 to plane3103 to EndUser |
| 1 Jun 1998 17:25:24.03 | 1 Jun 1998 17:28:26.65 | CellPhone to plane2103 to plane3103 to EndUser |
| 1 Jun 1998 17:28:26.65 | 1 Jun 1998 17:35:00.44 | CellPhone to plane2103 to plane3103 to plane3104 to EndUser |
| 1 Jun 1998 17:35:00.44 | 1 Jun 1998 17:37:14.93 | CellPhone to plane2104 to plane3104 to EndUser |
| 1 Jun 1998 17:37:14.93 | 1 Jun 1998 17:44:33.09 | CellPhone to plane2104 to plane3104 to plane3105 to EndUser |
| 1 Jun 1998 17:44:33.09 | 1 Jun 1998 17:46:00.61 | CellPhone to plane2105 to plane3105 to EndUser |
| 1 Jun 1998 17:46:00.61 | 1 Jun 1998 17:54:02.43 | CellPhone to plane2105 to plane3105 to plane3106 to EndUser |
| 1 Jun 1998 17:54:02.43 | 1 Jun 1998 17:54:43.55 | CellPhone to plane2106 to plane3106 to EndUser |
| 1 Jun 1998 17:54:43.55 | 1 Jun 1998 18:03:23.34 | CellPhone to plane2106 to plane3106 to plane3107 to EndUser |
| 1 Jun 1998 18:03:23.34 | 1 Jun 1998 18:03:28.62 | CellPhone to plane2106 to plane3106 to plane3108 to EndUser |

Report: CellPhone-Iridium-EndUser - Cost Data

File  Edit                                                                                    Help Chain-CellPhone-Iridium-EndUser

| Time (UTCG) | Total Cost | |
|---|---|---|
| 1 Jun 1998 16:00:00.00 | 4.000000 | CellPhone to plane1105 to plane2104 to plane2105 to EndUser |
| 1 Jun 1998 16:01:00.00 | 4.000000 | CellPhone to plane1105 to plane2104 to plane2105 to EndUser |
| 1 Jun 1998 16:02:00.00 | 4.000000 | CellPhone to plane1105 to plane2104 to plane2105 to EndUser |
| 1 Jun 1998 16:03:00.00 | 4.000000 | CellPhone to plane1105 to plane2104 to plane2105 to EndUser |
| 1 Jun 1998 16:04:00.00 | 3.000000 | CellPhone to plane1106 to plane2105 to EndUser |
| 1 Jun 1998 16:05:00.00 | 3.000000 | CellPhone to plane1106 to plane2105 to EndUser |
| 1 Jun 1998 16:06:00.00 | 3.000000 | CellPhone to plane1106 to plane2105 to EndUser |
| 1 Jun 1998 16:07:00.00 | 3.000000 | CellPhone to plane1106 to plane2105 to EndUser |
| 1 Jun 1998 16:08:00.00 | 3.000000 | CellPhone to plane1106 to plane2105 to EndUser |
| 1 Jun 1998 16:09:00.00 | 4.000000 | CellPhone to plane1106 to plane2105 to plane2106 to EndUser |
| 1 Jun 1998 16:10:00.00 | 4.000000 | CellPhone to plane1106 to plane2105 to plane2106 to EndUser |
| 1 Jun 1998 16:11:00.00 | 4.000000 | CellPhone to plane1106 to plane2105 to plane2106 to EndUser |
| 1 Jun 1998 16:12:00.00 | 4.000000 | CellPhone to plane1106 to plane2105 to plane2106 to EndUser |
| 1 Jun 1998 16:13:00.00 | 3.000000 | CellPhone to plane1107 to plane2106 to EndUser |
| 1 Jun 1998 16:14:00.00 | 3.000000 | CellPhone to plane1107 to plane2106 to EndUser |
| 1 Jun 1998 16:15:00.00 | 3.000000 | CellPhone to plane1107 to plane2106 to EndUser |
| 1 Jun 1998 16:16:00.00 | 3.000000 | CellPhone to plane1107 to plane2106 to EndUser |
| 1 Jun 1998 16:17:00.00 | 5.000000 | CellPhone to plane1107 to plane2106 to plane3106 to plane3107 to EndUser |
| 1 Jun 1998 16:18:00.00 | 4.000000 | CellPhone to plane1107 to plane2106 to plane2107 to EndUser |
| 1 Jun 1998 16:19:00.00 | 4.000000 | CellPhone to plane1107 to plane2106 to plane2107 to EndUser |
| 1 Jun 1998 16:20:00.00 | 4.000000 | CellPhone to plane1107 to plane2106 to plane2107 to EndUser |
| 1 Jun 1998 16:21:00.00 | 4.000000 | CellPhone to plane1107 to plane2106 to plane2107 to EndUser |
| 1 Jun 1998 16:22:00.00 | 2.000000 | CellPhone to plane2107 to EndUser |

FIGURE 7

METHOD AND APPARATUS FOR DETERMINING OPTIMAL PATHS AMONG OBJECTS OF A COMMUNICATIONS NETWORK

FIELD OF THE INVENTION

The invention claimed herein relates to the area of communications networks. More particularly, this invention relates to chains of ground stations and satellite constellations, (hereinafter referred to simply as "chains"), as well as other configurations of communications resources, such as systems involving aircraft and fixed and mobile surface units, and the problem of evaluating available links and identifying the optimal path between a starting point and the desired end point in the communications system when the availability of the links is in a constant state of change.

BACKGROUND OF THE INVENTION

In modern satellite communications networks, often consisting of dozens of satellites and numerous surface facilities, the process of determining which links to use in communicating between one point in the network and another can be extremely complex, time-consuming and error prone. In addition to such considerations as minimizing distance or the number of links, other factors such as location and conditions that may impact the quality of a given link can make one link more or less costly than another. Given such factors, determining the optimal combination of links to use in a specific situation can require hours of complex calculations with a significant possibility of error.

What is "optimal" will depend upon priorities and factors important to a given user or situation, but includes such criteria as minimizing the number of separate links or avoiding links that are undesirable due to distance, location (e.g. outside certain latitudes), interference factors, loading, limited availability, lack of reliability and other negative characteristics.

A satellite communications system that utilizes satellites in geosynchronous orbit is generally a static system, since the spacecraft do not change position appreciably relative to relay stations on the ground beneath them. Geosynchronous satellites, however, operate in very high altitudes on the order of 22,000 statue miles. The propagation delays inherent in conveying signals over a nearly 50,000 mile round-trip are not acceptable for many communication environments. Low Earth orbit systems are seen to be essentially static where one satellite merely hands off a communication to another satellite which moves into its place, covering the same cells on the Earth's surface as its predecessor-in-orbit.

A path between any two arbitrary nodes in the network is a sequence of nodes from the originating (source) node to the terminating (destination) node. In order to select a "best" path, some figure of merit for any candidate path is derived. The figure of merit consists of the additive "costs" of each of the links between nodes derived from the connectivity matrix. The link costs may include the additive "costs" associated with the nodes. Thus the cost of a path is just the sum of the link costs between adjacent nodes in the path sequence.

Regardless of the algorithm used to transform the network nodal connectivity to the "shortest path" between two nodes, (e.g., Floyd's Algorithm or Dijkstra's Algorithm, both provided in *Introduction to Algorithms* by Thomas Cormen, Charles Leiserson and Ronald Rivest, © 1990, chapter 25 for Dijkstra's Algorithm and chapter 26 for Floyd's Algorithm, therein referred to as the Floyd-Warshall Algorithm, which is the alternative nomenclature for Floyd's Algorithm), the cost of such a path is obtainable by taking the sum of the link costs, perhaps including some additive nodal cost, either by using Floyd's Algorithm or Dijkstra's Algorithm to make the required determination. As long as there is a single link cost factor used to determine the cost for the logical or physical links between two nodes, the approach to determining the shortest path value is straightforward.

The situation is not as clear cut when there are two or more independent cost factors used to determine an aggregate cost for a path to be used in evaluating the best or shortest path. It will be understood that when multiple costs are considered for evaluating a best or shortest path, the various cost considerations lead to different "shortest path" conclusions. For example, if hop count, i.e., the number of nodes traversed by a packet from source to destination node, is an overwhelming concern, one path within a network may be the shortest path. Alternatively, if delay is the major factor, i.e., the time it takes for a packet to travel from the source to the destination node, then another path within the network may be the best path. Still different conclusions may be reached if other factors, such as monetary cost, are taken into consideration.

When single cost functions are used as a means of obtaining figures of merit for various paths within the network, the concept of adding the costs of each link in the path, as discussed above, is the natural way to obtain the result. Known routing algorithms assume that costs add as the path is traversed. Common cost functions, used in path selection (e.g., "delay", "cost of transmission line facility", "hop count"), are additive. Individually, they are immediately adaptable to standard path-cost-determination algorithms. However, there are other cost-factors, (e.g., "percent available bandwidth", "ability to handle a specific protocol", "ability to handle a certain packet type") which are major determiners of path selection, but which are not additive. These types of cost factors cannot be treated by usual connectivity matrix based methods. The reason is that arithmetic addition is too limiting to describe the actions of many cost factors.

Therefore, a method for handling multi-cost factors in determining the relative costs of paths within a network is needed. Additionally, this method for handling multi-cost factors should also be capable of considering non-additive cost factors in the relative costs of paths determination.

The methods and apparatus disclosed in U.S. Pat. No. 5,740,164 to Liron, comprises software and hardware which manage satellite communication links between the origin and destination of telephone calls which convey voice, data, or video information. The methods of this invention select the best series of connections from a terrestrial gateway or terminal up through a satellite constellation and back down to Earth. The constellation operates in low Earth orbit, and provides continuous worldwide service. The pathway that is selected for a particular call is adaptive and able to change rapidly in response to the constantly changing geometry of the low Earth orbit constellation. Based upon inputs from the position determination algorithms that define the length of each link in the system, algorithms are provided to determine the optimal route for each transmission from each satellite and also establish the most efficient distribution pattern of traffic throughout the system.

In U.S. Pat. No. 4,905,233, issued Feb. 27, 1990, Cain et al. disclose a mechanism for establishing at least one transmission route between a source node and a destination node in a communications network. Transmission characteristics of each of the transmission paths among the nodes of the network are monitored so as to derive a plurality of path metrics representative of the ability of the network to transmit communication signals. Feasible transmission routes from source node to destination node are selected where the sum of path metrics from neighboring nodes to the destination node is less than the path metric of a transmission path, the end nodes of which correspond to the source and destination nodes. Communication signals are then transmitted from the source node to the destination node over the selected feasible transmission routes. Typical link metrics are presented, which include as terms normalized propagation plus processing delay, and expected transmission delay including queuing delay. Cain et al. do not describe a specific method of packet switching and routing in a low Earth orbit satellite communication system in which the metrics or algorithms are implemented to provide synchronous circuit switched communications services with uniform end-to-end transmission delays. While Cain et al. indicate that their system updates link metrics periodically at each node, they do not appear to reveal an adaptive, dynamic, distributed routing system which continuously runs an adaptive routing algorithm to pre-calculate the optimal route for each packet, one step at a time, at each satellite. Cain's routing procedure is autonomous in that each node determines a set of routing tables with no inputs from other nodes (Cain et al. at col. 8, line 28–29). According to U.S. Pat. No. 5,754,543 to Seid, connectivity matrix-based multi-cost routing includes defining a generally additive operator which is able to add traditionally (arithmetic) additive cost factors and which takes into account cost factors which are not additive, the generally additive operator being defined such that distributive and commutative properties are applicable, and wherein the generally additive operator is applicable to connectivity matrix-based factors for determining the relative costs of paths within a network, particularly with respect to multi-cost factors.

While there exist processes such as Floyd's Algorithm for finding the least expensive path between all vertices in a graph, or Dijkstra's Algorithm for finding the lowest cost path between a single starting vertex and all of the other vertices in a graph, there is no procedure specifically designed to take account of the complexities of a modern telecommunications network, especially a satellite network subject to constant changes in its geometries and other factors that affect the availability and quality of communications links.

In view of the complexities of modern communication systems, what is needed is an automated procedure specifically designed to determine the optimal path among the objects of a satellite communications chain. Such a procedure, employing a suitable least cost path algorithm as one of its components, would address the dynamically changing situation in which the communications task is being carried out. The procedure would provide quick and reliable numerical data and graphic displays to assist the user or controller in identifying the optimal path, preferably utilizing an existing computer program for satellite system analysis.

SUMMARY OF THE INVENTION

It is an object of the present invention to provide a method and apparatus for determining the optimal path among objects of a telecommunication network.

It is a further object of the present invention to provide a method and apparatus for determining the optimal path among objects of a satellite communications chain, taking account of factors affecting the quality, as well as the availability, of links in the network.

It is a further object of the claimed invention to provide a method and apparatus for determining the optimal path among objects of a satellite communications chain, taking account of factors affecting the quality, as well as the availability, of links in the network, and utilizing an existing computer program for satellite system analysis to produce numerical data and graphic displays to assist in identifying the optimal path.

These and other objects of the present invention will become apparent to those skilled in the art from a review of the specification and claims that follow.

The present invention is a software-driven system that permits review and analysis of complex arrays of communication links to determine the optimal path for communications from a starting point to a desired end point during particular time constrained intervals.

The method comprises generally the following steps, which are more fully explained in the Detailed Description of the Invention that follows.

All communication systems comprise a number of communications "objects." As used in this application, an "object" is a communication resource such as a ground station, a satellite, an aircraft, a ship at sea, or indeed any other communication resource capable of sending and receiving a communication of interest, whether voice, data, or any other type of communication.

The present invention comprises a software driven method and apparatus that first determines what communications "links" are available and constructs a link availability matrix detailing all the time intervals during which pairs of links in the communications system are available.

The start times of the intervals in the link availability matrix are chronologically ordered in to a list of Primary Evaluation Times.

The earliest of the Primary Evaluation Times is designated the current evaluation time. For the Current Time being evaluated, a Cost Matrix is constructed based on link "weights" which are indicators of the desirability of the link. For example, a link that is available is given a value of "1" and a link that is unavailable is given a weight of "infinity."

Using the Cost matrix, the system of the present invention analyzes the link costs, selecting the least cost links between objects of the communications system.

A total Cost Array corresponding to the desired end point (and end object) is then evaluated.

If the Total Cost Array value corresponding to the desired end point is not "infinity," that means a series of communications links from a start point to an end point is available, and a successful communication path can be established for the "current time" being evaluated. Further evaluation of the links can then take place as more fully explained below.

If the Total Cost Array value corresponding to the desired end point is "infinity," it is not possible to establish communication between the starting point and the ending point for the desired communications at the current evaluation time. If this occurs, the system selects the next "Primary Evaluation Time" later than the "Current Time" and the analysis is repeated until no more Primary Evaluation Times exist. In this way all Primary Evaluation Times can be analyzed for suitability for the desired communications from a start point to an end point. Communication can then be planned or executed based upon the order of links selected.

BRIEF DESCRIPTIONS OF THE FIGURES

FIG. 5 illustrates the results of reports noting the interval in which links are available.

DETAILED DESCRIPTION OF THE INVENTION

As noted above, the present invention is a software method and associated apparatus for evaluating and selecting links for desired communications between two points.

The present invention operates on an IBM PC or compatible having at least a Pentium processor with 16MB of RAM (32 MB recommended) and 220 MB of disk space. The present invention will also operate on various UNIX platforms, such as the Sun/Solaris 2.4 and 2.5, the Sun OS 4.1.3, Hewlett Packard UX 9.07, Silicon Graphics IRIX 5.3 and 6.3, DEC Unix 3.0 and higher, and IBM AIX 4.2. The present invention also comprises input and output means so that data can be input to the program specifying the transmitter. The typical input means is a keyboard, although other input means such as mouse and voice input are also contemplated.

As previously noted, the output to the analyst can be in the form of a video display including animated maps, reports and graphs, and/or in the form of hard copy. Such hard copy output also includes printouts of maps, reports and graphs.

The present invention provides a system of analysis to manage a communications system. A communications system comprises several elements including fixed ground stations, mobile ground stations, communications ships, low Earth orbit satellites, geosynchronous satellites, and the like. Each element of the communications system is referred to as an object or node. In managing the communications system, the manager or operator identifies a starting point, a destination point, and all the assets (objects or nodes) in the system. A finite time interval is also set for the analysis. For aiding in the explanation of the system of the present invention, reference may be made to a desired communication between New York City, as the origination point, and Tokyo, as the destination point. Various assets are included including a ground station in New York, various satellites, A, B, C . . . ,etc., and a ground station in Tokyo, Japan. These points are utilized for illustration only. Various origination and destination points are applicable with any combination of assets or objects.

A link availability matrix is constructed. This matrix includes the link availability intervals for each possible pairing of objects or nodes in a communications network. The directionality of the communication link is inherently built into the matrix. That is, it is possible, for example, for the availability intervals for B-A to be different than the communication availability intervals from satellite A to satellite B. The link availability interval includes a start time and an end time detailing when a pair of objects can communicate. The system of the present invention is built around this availability matrix. The link intervals start and end times are accurately defined to increase the advantages of the system. In one embodiment of the present invention, the link intervals are preferably defined to the $\frac{1}{100}$ of a second and most preferably to the $\frac{1}{1000}$ of a second. The link availability matrix is constructed for a period of time set by the operator. This time interval may be arbitrary or dictated by the availability of the objects in the particular network.

The start times of the intervals in the link availability matrix are arranged in chronological order list from the earliest time to the latest. The start times are defined as Primary Evaluation Times (PET). The first PET is the first time there is a communications link between any two objects in the network.

At the start of the evaluation process, the first PET is designated as the initial Current Evaluation Time (CET). This is the first single point in time in which we want to see if there is a connection between the origination point and the destination point (for example, between NY and Tokyo).

For the CET, a cost matrix is constructed on the basis of the link availability matrix. The cost matrix is set up in terms of values or link weights. For example, using hop count as the cost factor, a link weight or value of 1.0 is given to indicate "link available" and a link weight or value of infinity is given to indicate "link not available". Various weight scales are utilized on the basis of various parameters such as link distance, link quality, cost functions, link active/inactive or the like.

For the initial CET, an analysis is made from the cost matrix to determine if a connection is possible between the origination point (NY) and the destination point (Tokyo). If the first CET failed in providing a connection between the origination point and destination point, the system then considers the next Primary Evaluation Time (PET). The next PET is established in the link availability matrix. It is important to note that the system does not simply perform evaluations at a randomly set time step. The system looks for the next point in time where there is a change in the conditions of the network. This next point in time is the second PET. This is the next possible time where a link change occurs. Thus, system cycles or calculations are not wasted on preset time steps where the evaluation time may hit before a possible system change or after a possible system change. With the PET sequencing in the link availability matrix, guesswork and unnecessary calculations are not undertaken, resulting in significant improvements in both efficiency and accuracy.

This process of selecting the next PET, designating this time as the CET, constructing and evaluating the cost matrix is repeated until a connection is found for the two points. In the example, the process is repeated until a connection between NY and Tokyo is found.

The process of evaluating the cost matrix involves the construction of a least cost array and a total cost array for available communications links. The terms "least cost array" and "total cost array" have a meaning well known in the art. In the simplest definition, the "total cost array" relates to the expense of the links between the origination and destination points. The term "least cost array" is the identification of the previous node used to reach any one object or node. For example, again using hop count as the cost factor, if the NY/Tokyo connection is available through NY-satellite A-satellite C- Tokyo, the value of the "total cost array" position corresponding to Tokyo is 3. The "least cost array" is a link list for the objects used in connecting from NY to Tokyo. The least cost array allows one to look at any entry or object in the system to determine the previous link in the network. Various "cost" factors are utilized in constructing these arrays. Such factors include, but are not limited to, the number of links (hops), link distance between nodes, location of nodes, interference factors, loading availability, reliability, monetary costs and the like. These are system mapping terms.

For the example of NY-SatA-SatC-Tokyo connection, the table below is illustrative of a cost matrix, where hop count has been used as the cost factor. A hypothetical cost matrix constructed at the CET is shown in the table.

TABLE 1

|  | New York | Satellite A | Satellite B | Satellite C | Tokyo |
|---|---|---|---|---|---|
| New York | 0.00 | 1.00 | Infinity | Infinity | Infinity |
| Satellite A | Infinity | 0.00 | Infinity | 1.00 | Infinity |
| Satellite B | Infinity | 1.00 | 0.00 | 1.00 | 1.00 |
| Satellite C | Infinity | 1.00 | Infinity | 0.00 | 1.00 |
| Tokyo | Infinity | Infinity | Infinity | Infinity | 0.00 |

Cost Matric for New York-Satellite A-Satellite B-Satellite C-Tokyo Connection

The "total cost array" constructed from this cost matrix would then be:
NY Sat. A Sat. B Sat. C Tokyo
[0.00, 1.00, Inf., 2.00, 3.00]
The "least cost array" would then be:
[0, 0, 0, 1, 3]

The node numbering starts at zero. The rows in the cost matrix correlate to the starting node of a link, while the columns correlate to the ending node. Values in the "total cost array" are not integer values. The two decimal points of precision used in this example are arbitrary. The precision is only limited by the computer platform running the software. Values in the "least cost array" are integer values since they correspond to node numbers. As indicated by the "Inf" (infinity) value of the total cost array position corresponding to Sat B, Sat B cannot be reached at the CET. Hence, the value corresponding to Sat B in the least cost array is initialized but never set. The directionality of the links should be noted. Sat B can communicate with Sat A, Sat C, and Tokyo. However, no object in the network can communicate with Sat B.

After determining the connection path between the origination point and destination point, the system takes the next step and looks for the point in time where we cannot use the exact connection path. The system goes back to the link availability matrix and looks at the stop times (not start times) in the link intervals between the points of the connection path. Using availability intervals where the start is less than or equal to the CET, the earliest interval stop time which is later than or equal to the CET is selected. Any intervals from the Link Availability Matrix where the interval stop time equals the CET are removed. The stop time selected is compared to the CET. If the stop time is not equal to the CET, an interval of connectivity has been found. The CET is set equal to the connectivity stop time and the process is repeated. However, if the stop time is equal to the CET, there may not be connectivity from the origin to the destination beginning at the CET via paths different than those already found. The CET is kept and the process is repeated. When there are no interval stop times greater than the CET, a point has been found where there is a discontinuity in the network.

Figure 6:
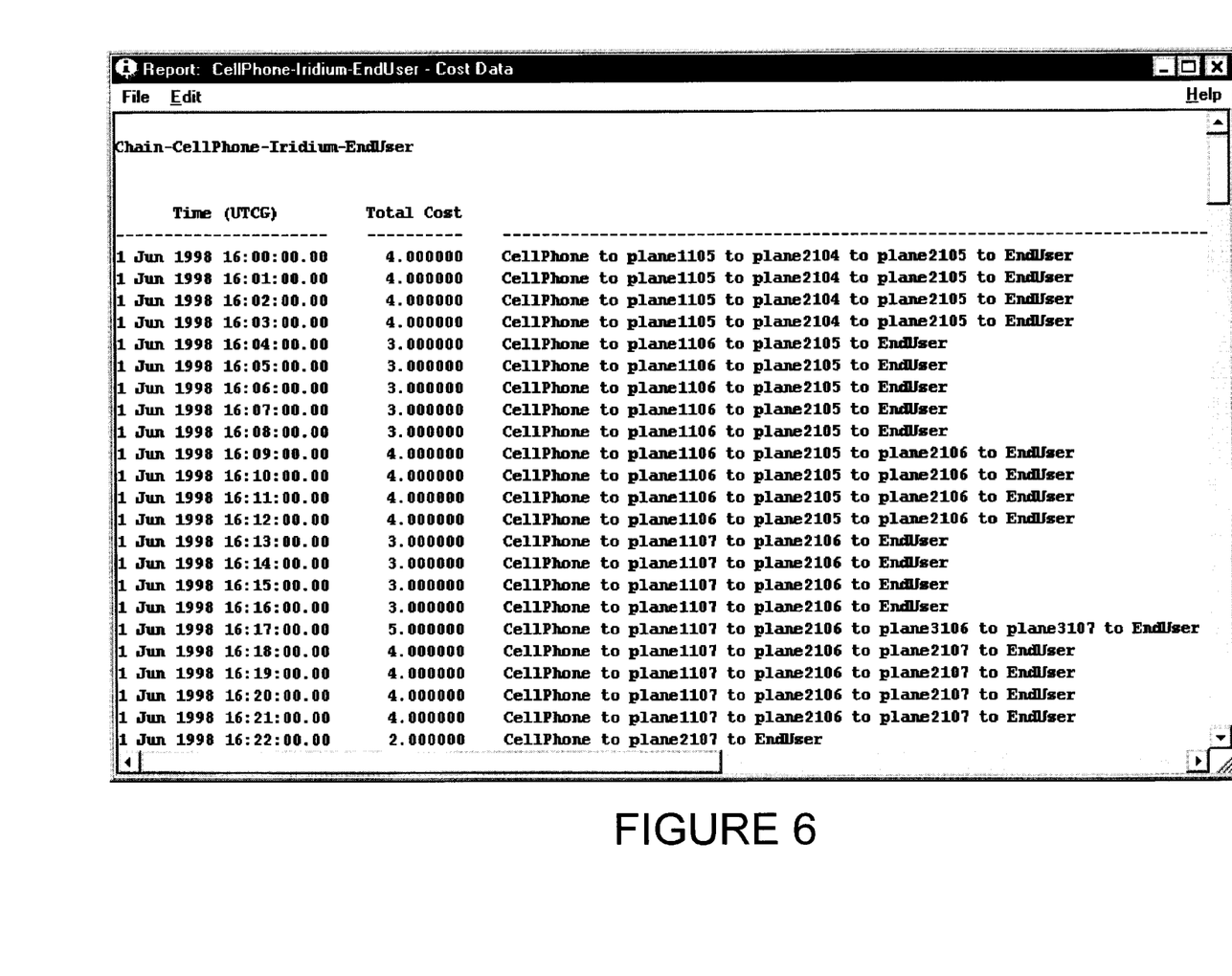
FIG. 6 illustrates the least cost paths between objects at a specific point in time.
Figure 7:
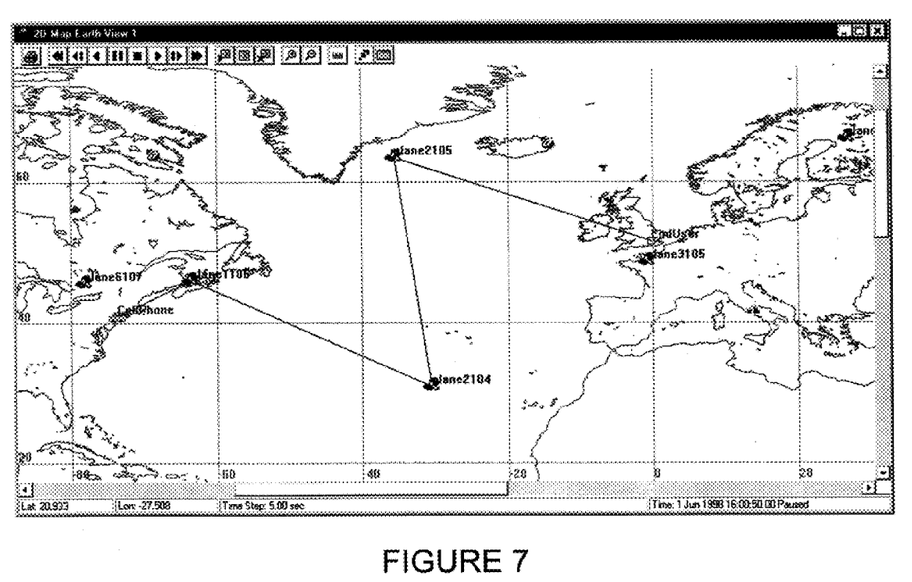
FIG. 7 graphically illustrates the least cost route between a start and an end object in a communications path.

For the time the connection is broken, the system searches for the next start time (PET) and looks for a connection. When a connection is found, the process is repeated to find a disconnect time. This is carried out through the scenario interval until we utilize all the PET values. At the end of this process, displays such as FIGS. 5, 6, and 7 are available to show the results.

In our example, the system reviews the stop times between the links NY to satellite A to satellite C to Tokyo. This again is not a random selection of preset time steps. The link availability matrix stop times identify the exact next point in time where a change in the link availability takes place. By using this method, system efficiency and accuracy is improved over an iterative process.

Figure 1:
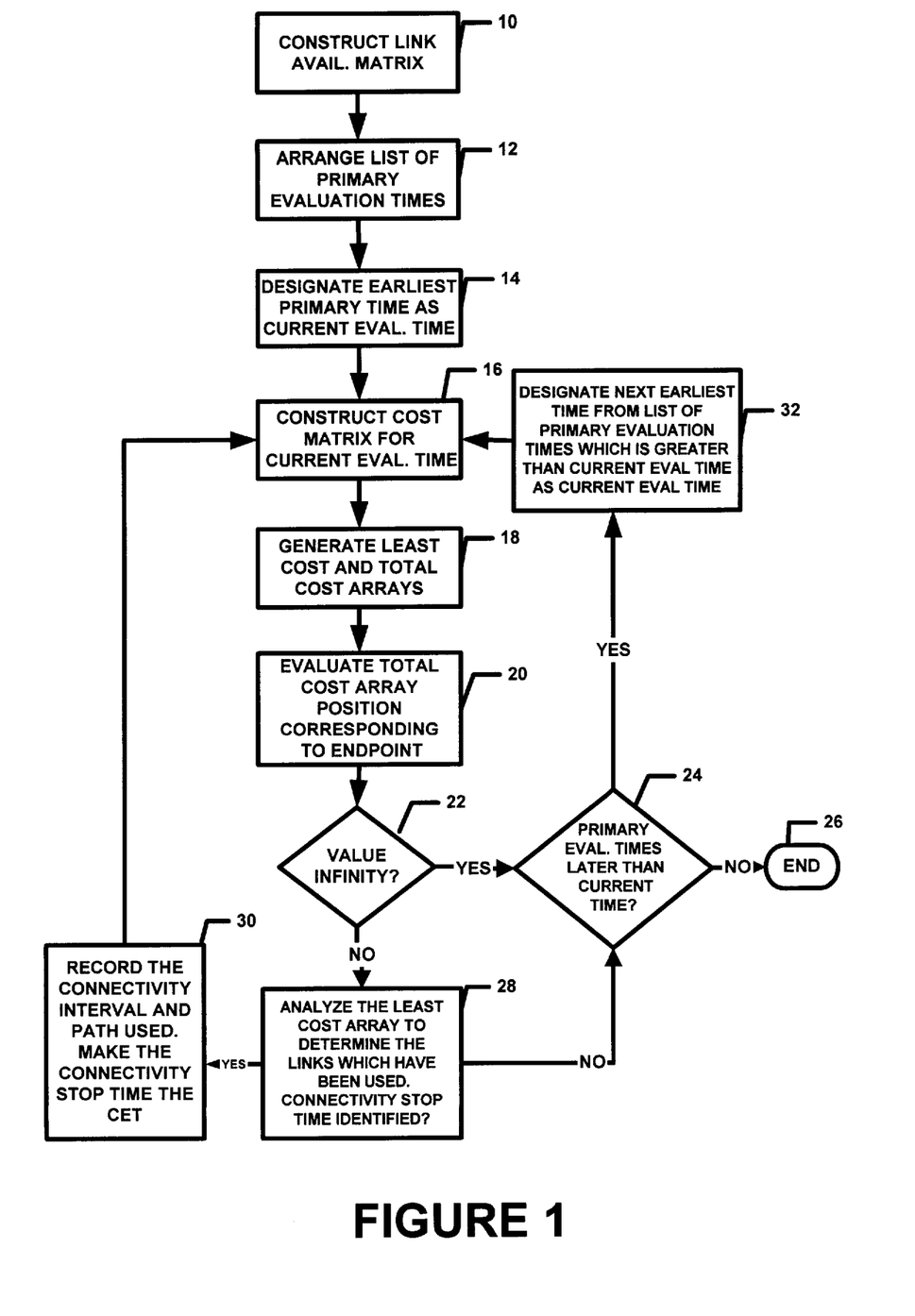
FIG. 1 illustrates the overall analysis flow of the present invention.

Referring to FIG. 1, the overall analysis flow of the present invention is illustrated.

1. A Link Availability Matrix containing the link availability intervals for each possible pairing of objects in the network is constructed 10. The availability intervals are determined by invoking various criteria, which include, in one embodiment of the method, "Always," "Never," "Time Dependent" and a cost function.
2. The start times of the intervals contained in the Link Availability Matrix are arranged into an increasing ordered list of Primary Evaluation Times 12.
3. The earliest of the Primary Evaluation Times which is designated the Current Evaluation Time 14.
4. For the Current Evaluation Time, a Cost Matrix is constructed 16 on the basis of the Link Availability Matrix. The Cost Matrix is set up in terms of link weights, such as a weight of 1 to indicate "link available" and a weight of infinity to indicate "link not available," or a scale of weights assigned on the basis of cost functions such as link distance, link quality, link active/inactive etc.
5. A least cost array and a total cost array associated with available communications links are constructed 18 (further described below in FIG. 2).
6. The value in the Total Cost Array corresponding to the desired end object is evaluated 20.
7. If the value in of the Total Cost Array 20 is not infinity 22, then it is possible to reach the end object from the starting object at the Current Evaluation Time. In this event, the Least Cost Array is evaluated for the link characteristics of the links identified 28.

Figure 3:
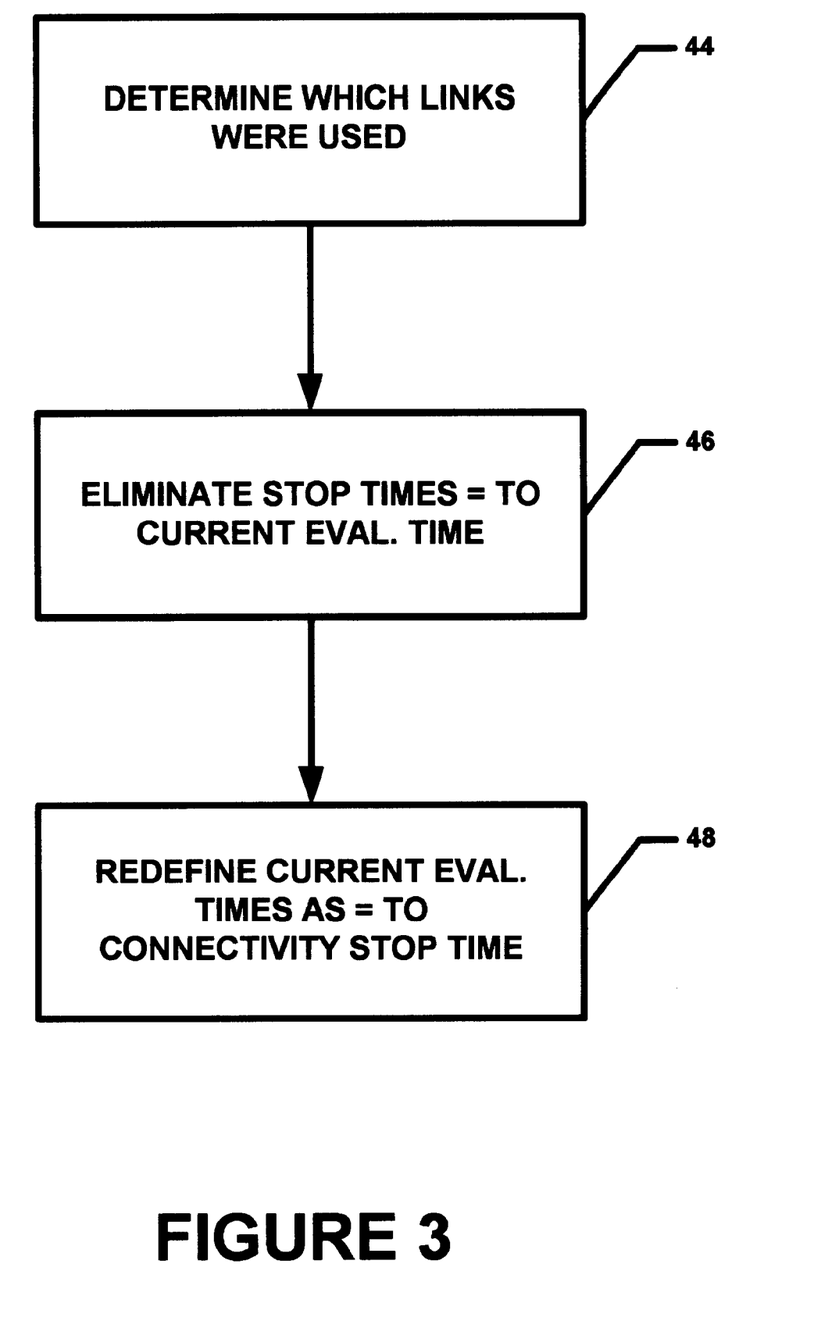
FIG. 3 illustrates the procedure when communications links are available.

The Least Cost Array method proceeds as follows:
1) With reference to the Least Cost Array generated in Step 5, a determination is made as to what links were used to complete the connectivity from the starting object to the end object at the Current Evaluation Time.
2) The availability intervals, that is the times during which it is possible for 6 communication between two links to occur, for the links identified in Step 7(1) are examined 30. For intervals with a start time at or before the Current Evaluation Time, the earliest stop time at or after the Current Evaluation Time is identified. Any interval in the Link Availability Matrix in which the stop time is equal to the Current Evaluation Time is eliminated from further consideration. One of two cases will now exist.
A) If the stop time is not equal to the Current Evaluation Time, an interval of connectivity has been found. That interval is defined to start at the Current Evaluation Time and end at the above-determined connectivity stop time. The Current Evaluation Time is then redefined as equal to the connectivity stop time. (FIG. 3, 48).
B) If the stop time is equal to the Current Evaluation Time, it is possible that connectivity from the starting object to the end object may not exist at the Current Evaluation Time via any path other than those already found.

3) Processing continues at Step 4.

If the value in Step 6 is infinity 22, it is impossible to reach the end object from the starting object at the current evaluation time. One of the following cases will occur:

1) If there are one or more times in the list of Primary Evaluation Times later than the Current Evaluation Time 24, processing continues 32 by designating the next earliest time from the list of PET, which is greater than the CET as the current CET and following step 3.

2) If there are no times remaining in the list of Primary Evaluation Times later than the Current Evaluation Time, all connectivity intervals have been determined, and the evaluation is finished 26.

Figure 2:
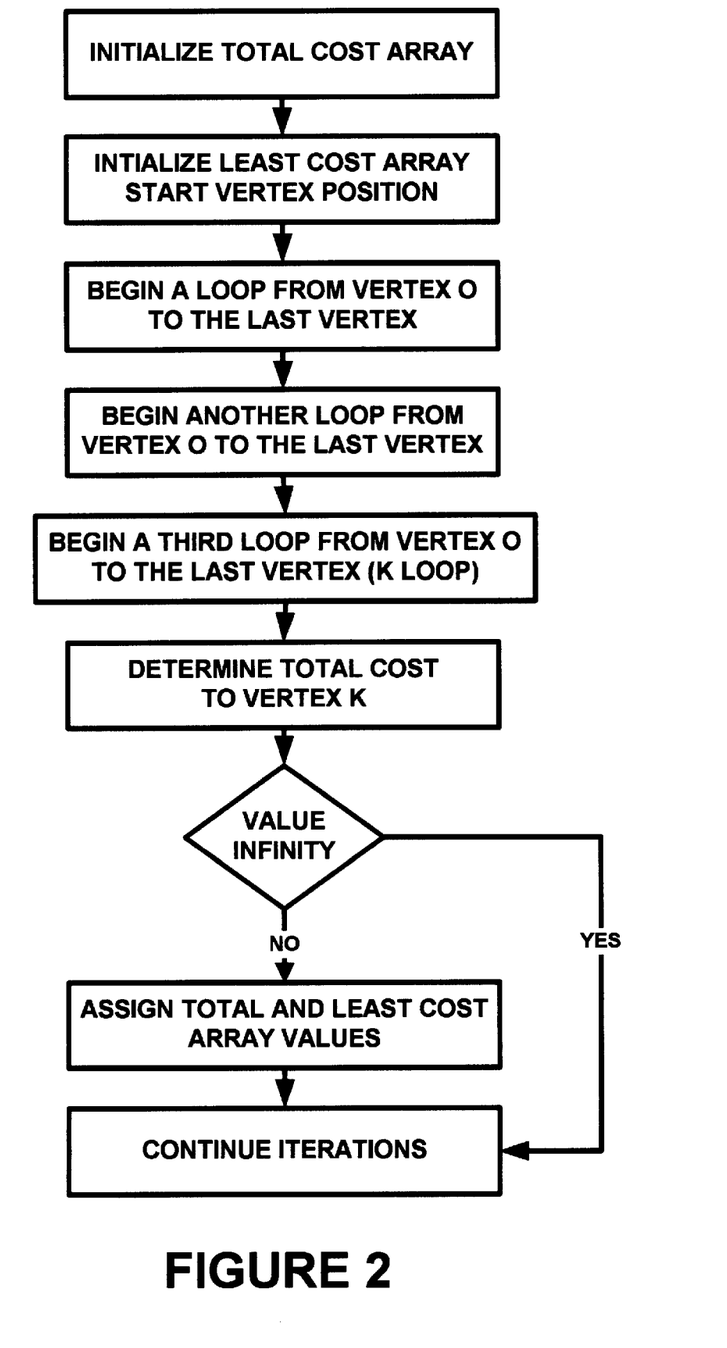
FIG. 2 illustrates the evaluation and computation of the Least Cost Array for links.

Referring to FIG. 2, the generation of the Least Cost Array and Total Cost Arrays is illustrated. As noted earlier, the Cost Matrix is used for the determination of more specific costs associate with the links of the communication system. Using a procedure based upon Dijkstra's Algorithm, the following steps are followed:

1) Initialize the Total Cost Array.
   A) Initialize the total cost from start vertex to all other vertices to be infinity.
   B) Initialize total cost from start vertex to itself to be 0.0.

2) Initialize the Least cost Array position corresponding to the start vertex to be the start vertex. (e.g., if the vertex 2 is the start vertex, initialize this array position to be 0).

3) Begin an iterative loop from the first vertex (vertex 0) to the last vertex.

4) Begin a second iterative loop from the first vertex (vertex 0) to the last vertex.

5) Begin a third iterative loop from the first vertex (vertex 0) to the last vertex.

6) If the index of the second loop is not the same as the third loop, calculate the cumulative cost to the vertex associated with the value of the index for the third loop. In other words, the index of the second loop represents the preceding vertex, and the index of the third loop represents the current loop being evaluated. The cumulative cost is the cost to get from the start vertex to the preceding vertex, plus the cost between the preceding vertex and the current vertex. If this value is not infinity (can not get there), and it is less than a previous cost to this vertex via a different path, then:
   a) assign the value corresponding to this vertex in the Total Cost Array the calculated cumulative cost.
   b) assign the value corresponding to this vertex in the Least Cost Array the previous vertex value.

In the preferred embodiment, the above method employs an existing computer program for satellite system analysis to generate reports, graphs and map displays of the results generated by applying the method to a chain of communications satellites and ground facilities. An example of such a program is Satellite Tool Kit, produced by Analytical Graphics, Inc., of Malvern, Pa.

Figure 4:
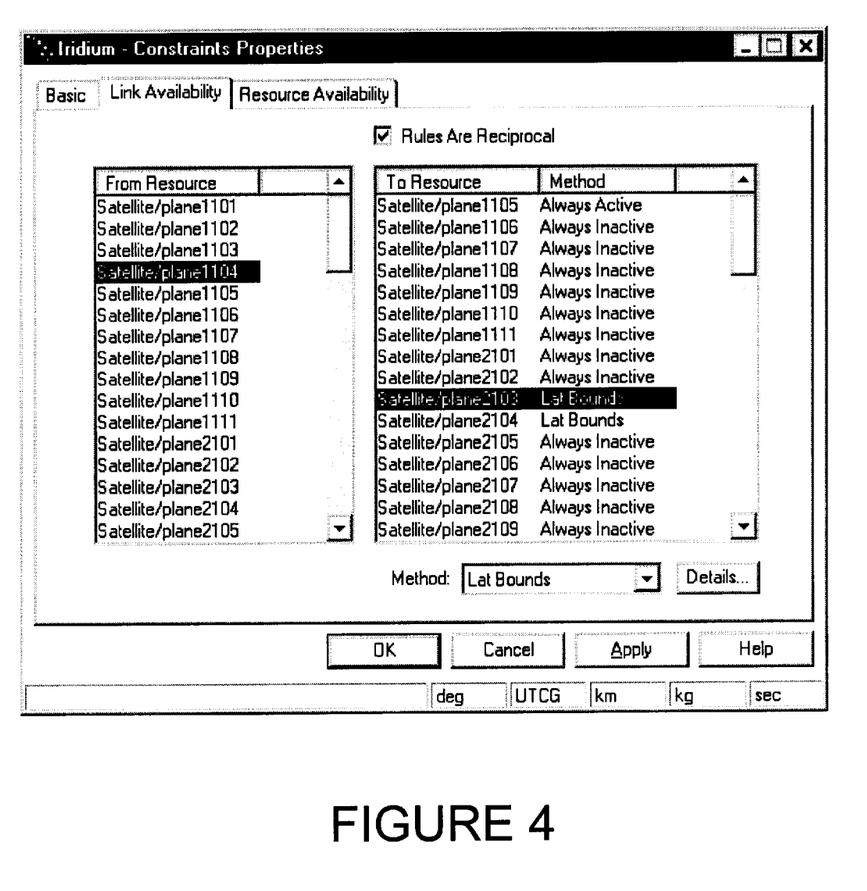
FIG. 4 illustrates the user interface for imposing constraints on the links to objects in the communications chain.

Referring to FIG. 4, the user interface of Satellite Tool Kit that is used for imposing constraints on links to objects in the communications chain is illustrated. Constraints such as exclusion above and below certain latitude bounds can be imposed by the user, although this is not meant as a limitation.

FIGS. 5 and 6 illustrate typical reports of the results of applying the method of the present invention. FIG. 5 shows lists of paths by the time intervals during which they are available. FIG. 6 identifies the least cost path between a start and end object as calculated by the present invention, taking into account any constraints that the user may have imposed via interface panels such as that illustrated in FIG. 4. Based on this information, communications may be planned and/or sent with a high probability of success.

A system and method of determining optimal paths for communication between points via multiple communications resources has been shown. It will be appreciated by those skilled in the art that other factors may also be considered in the decision process and the weighting process for resource availability without departing from the scope of the invention as claimed.

What we claim is:

1. A method for selecting a path between an originating point and a destination point in a communications network comprising a number of objects for a certain time interval, the method comprising:

a) constructing a link availability matrix which comprises a start time and an end time for a link between any two objects in the communications network;

b) arranging the start time for all links in the link availability matrix in a chronological order;

c) constructing a cost matrix for the first start time in the link availability matrix based on selected factors and continuing through the following start times until a connecting path is found between the originating point and destination point using a number of objects in the network;

d) after a connecting path is found, determining a first disconnect time based on the end times in the link availability matrix for the objects in the connecting path;

e) repeating steps c) and d) for all subsequent start time in the link availability matrix for the time interval to identify other connecting paths for the origination and destination points; and f) selecting an optimal path for the communication between the origination and destination points based on the selected factors.

2. The method of claim 1 wherein the selected factors are selected from the group consisting of distance, location, interference factors, loading availability, reliability, costs, and other negative characteristics.

3. The method of claim 1 wherein the communications network comprises ground stations and satellites.

4. The method of claim 1 wherein the communications network comprises low Earth orbit satellites.

5. The method of claim 1 further comprising graphical means to display the optimal path for the communication including the available objects.

6. The method of claim 5 wherein the graphical means includes Earth imagery and relative position of the objects in the communications network.

7. A system for selecting an optimal path between an originating point and a destination point in a communications network comprising a number of objects for a certain time interval, the system comprising:

(a) means for constructing a link availability matrix which comprises a start time and an end time for a link between any two objects in the communications network;

(b) means for arranging the start time for all links in the link availability matrix in a chronological order;

(c) software for constructing a cost matrix for the first start time in the link availability matrix based on selected factors and continuing through the following start times until a connecting path is found between the originating point and destination point using a number of objects in the network;

(d) after a connecting path is found, means for determining a first disconnect time based on the end times in the link availability matrix for the objects in the connecting path; and (e) software for repeating steps c) and d) for all subsequent start time in the link availability matrix for the time interval to identify other connecting paths for the origination and destination points.

8. The system of claim 7, further comprising software to show the optimal path imagery with a designation for the objects in the communication network.

9. A method for selecting a path between an originating point and a destination point in a communications network comprising a number of objects selected from the group comprising ground communication stations, communication satellites and other communication objects, for a certain time interval, the method comprising:

(a) constructing a link availability matrix which comprises a start time and an end time for a link between any two objects in the communications network;

(b) arranging the start time for all links in the link availability matrix in a chronological order;

(c) constructing a cost matrix for the first start time in the link availability matrix based on selected factors and continuing through the following start times until a connecting path is found between the originating point and destination point using a number of objects in the network;

(d) after a connecting path is found, determining a first disconnect time based on the end times in the link availability matrix for the objects in the connecting path;

(e) repeating steps (c) and (d) for all subsequent start time in the link availability matrix for the time interval to identify other connecting paths for the origination and destination points; and (f) selecting an optimal path for the communication between the origination and destination points based on the selected factors.

10. The method of claim 9 wherein the selected factors are selected from the group consisting of distance, location, interference factors, loading availability, reliability, costs, and other negative characteristics.

11. The method of claim 9 wherein the communications network comprises low Earth orbit satellites.

12. The method of claim 9 further comprising graphical means to display the optimal path for the communication including the available objects.

13. The method of claim 12 wherein the graphical means includes Earth imagery and relative position of the objects in the communications network.

* * * * *

UNITED STATES PATENT AND TRADEMARK OFFICE
CERTIFICATE OF CORRECTION

PATENT NO. : 6,195,553 B1
DATED : February 27, 2001
INVENTOR(S) : Claffey, Douglas J; Holland, David M.; Woodburn, James W.

It is certified that error appears in the above-identified patent and that said Letters Patent is hereby corrected as shown below:

<u>Title page,</u>
Inventors: should read -- Claffey, Douglas J.; Holland, David M.; Woodburn, James W.

Signed and Sealed this

Eleventh Day of December, 2001

*Attest:*

*Nicholas P. Godici*

NICHOLAS P. GODICI
*Attesting Officer*     *Acting Director of the United States Patent and Trademark Office*